(12) United States Patent
Müller

(10) Patent No.: US 7,298,549 B2
(45) Date of Patent: Nov. 20, 2007

(54) MICROSCOPE

(75) Inventor: Jürgen Müller, Hamburg (DE)

(73) Assignee: Evotec AG, Hamburg (DE)

( * ) Notice: Subject to any disclaimer, the term of this patent is extended or adjusted under 35 U.S.C. 154(b) by 136 days.

(21) Appl. No.: 10/467,641

(22) PCT Filed: Feb. 15, 2002

(86) PCT No.: PCT/EP02/01610

§ 371 (c)(1), (2), (4) Date: Jul. 1, 2004

(87) PCT Pub. No.: WO02/067037

PCT Pub. Date: Aug. 29, 2002

(65) Prior Publication Data

US 2004/0246572 A1 Dec. 9, 2004

(30) Foreign Application Priority Data

Feb. 16, 2001 (DE) ............... 101 07 210

(51) Int. Cl.
*G02B 21/00* (2006.01)

(52) U.S. Cl. .................. 359/381; 359/368; 359/379; 359/385

(58) Field of Classification Search ........ 359/368–390, 359/738–740; 351/200–247
See application file for complete search history.

(56) References Cited

U.S. PATENT DOCUMENTS

| | | | |
|---|---|---|---|
| 4,863,226 A | 9/1989 | Houpt et al. | 359/368 |
| 5,225,671 A | 7/1993 | Fukuyama | 250/216 |
| 5,334,830 A | 8/1994 | Fukuyama et al. | 250/216 |
| 5,760,951 A * | 6/1998 | Dixon et al. | 359/385 |
| 6,084,672 A * | 7/2000 | Lewin | 356/496 |
| 6,108,127 A * | 8/2000 | Atkinson | 359/389 |
| 6,563,632 B1 * | 5/2003 | Schoeppe et al. | 359/368 |
| 6,661,509 B2 * | 12/2003 | Deck et al. | 356/301 |
| 6,909,542 B2 * | 6/2005 | Sasaki | 359/385 |

FOREIGN PATENT DOCUMENTS

| | | |
|---|---|---|
| EP | 0 284 136 A1 | 9/1988 |
| WO | WO 98/28646 A1 | 7/1998 |

* cited by examiner

*Primary Examiner*—Thong Q Nguyen
(74) *Attorney, Agent, or Firm*—Griffin & Szipl, P.C.

(57) ABSTRACT

A confocal microscope has a specimen holding device for holding a specimen (18). The specimen (18) is illuminated by an illuminating unit (10). An optics unit (12) serves to direct radiation produced by the illuminating unit (10) toward the specimen (18) and to direct the radiation emitted by the specimen toward a detector unit (20). The confocal microscope also comprises an aperture diaphragm (34) that is placed in the beam path in front of the detector unit (20). In addition, a focusing lens (30) is provided in the beam path in front of the aperture diaphragm (34). The focusing lens (30) can be moved in order to adjust the confocal microscope, for example, in order to compensate for thermal stresses.

10 Claims, 1 Drawing Sheet

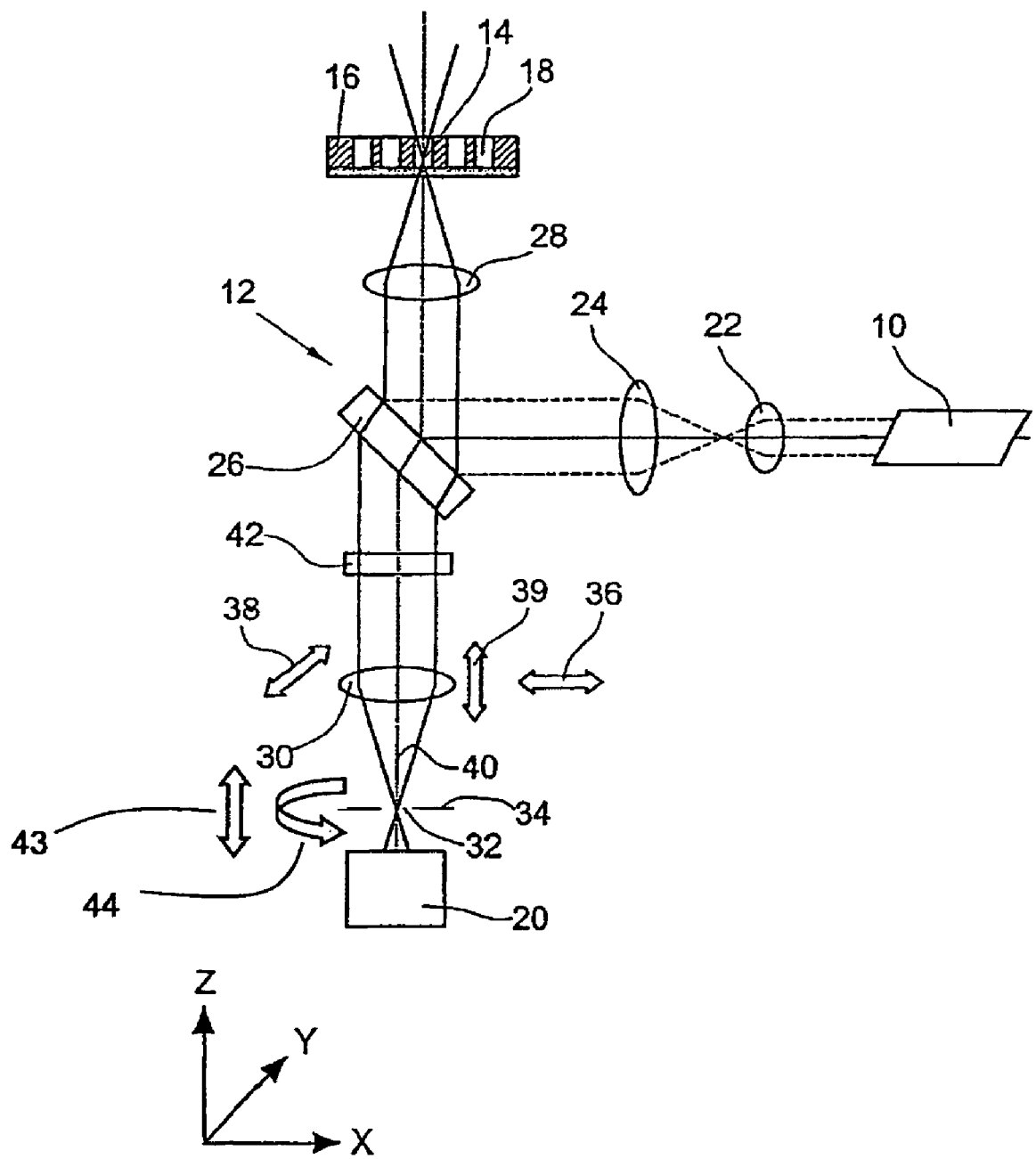

MICROSCOPE

This application is a national stage application in the U.S. of International Patent Application No. PCT/EP02/01610, filed Feb. 15, 2002, and which claims priority from German Patent Application No. 101 07 210.4, filed Feb. 16, 2001.

FIELD OF THE INVENTION

The invention relates to a microscope, particularly a confocal microscope for the single-molecule spectroscopy. In the following, any kind of magnifying means composed of two lens arrangements will be understood by a microscope.

BACKGROUND OF THE INVENTION

Confocal microscopes are particularly suitable for the high-resolution measurement in the direction of the Z-axis, i.e., in longitudinal directions of the beam path of the microscope. To this end, confocal microscopes comprise an illuminating unit that typically is a laser. A specimen held by the specimen holding device is illuminated by the illuminating unit. To this end, an optics unit is provided which directs radiation produced by the illuminating unit toward the specimen and directs radiation given off by the specimen toward a detector unit. As a part of the optics, conventional confocal microscopes comprise a beam splitter. On the one hand, the beam splitter directs the light emitted from the illuminating unit toward the specimen and on the other hand, it leaves through the light reflected by the specimen so that it can reach a detector unit arranged behind the beam splitter in the beam path through an aperture diaphragm. As an illuminating unit, different illuminating units may be provided which, for example, produce visible light or also wavelengths in the non-visible range. In front of the detector unit, an aperture diaphragm is arranged and a focusing lens is arranged in front of the latter.

By means of the focusing lens, the beam path is focused in the opening of the aperture diaphragm.

By focusing the beam path in the opening of the aperture diaphragm, a relatively high light flux reaches the detector. Even a slight defocusing by displacing the object plane in Z-direction leads to a blurred image on the aperture diaphragm. This results in a smaller light flux since the focus of the focusing lens is no longer focused in the opening of the aperture diaphragm and thus, a smaller light flux comes through the diaphragm opening. Displacing the object plane in the X-Y-plane also results in a displacement of the focus in the plane of the aperture diaphragm. Thereby, the light quantity passing the aperture diaphragm is reduced since the focus is no longer focused in the opening of the aperture diaphragm.

When confocal microscopes are used in high-throughput screening, the focus of the microscope objective is arranged in a biological or chemical specimen. Since the specimens are minimum quantities of specimen liquid having a volume in the microliter or nanoliter range, the confocal microscope used in high-throughput screening must be a highly precise device. This requirement exists all the more as specimens in the submicroliter range are examined in modern high-throughput screening installations.

Because of the required very high accuracy of the focusing in the specimen, even very small temperature changes lead to the maladjustment of the confocal microscope. Particularly, a temperature-dependent maladjustment of the aperture diaphragm itself leads to the impairment of the accuracy of the microscope. Even slight maladjustments lead to that the illumination-side and the detection-side focus are no longer congruent. This results in a signal displacement and a considerable falsification of the measuring results. In addition, in the single-molecule detection, the assumption of the focus geometry is no longer valid in case of even a slight maladjustment. Further, the accuracy of the measuring results is influenced by inaccuracies of the laser by which the focus is displaced as well. Further, the measuring accuracy of confocal microscopes is influenced by the fact that the beam splitter provided in the optics unit has to be exchanged in dependence on the wavelength produced by the laser and given off by the specimen. Upon exchanging the beam splitter, slight position changes thereof occur. This also leads to a focus displacement and thus to a falsification of the measuring results. The beam splitter can displace relative to the excitation optics and the objective by temperature influences.

For adjusting, it is known from U.S. Pat. No. 4,863,226 to provide an adjusting mechanism for the aperture diaphragm. By the adjusting mechanism, the aperture diaphragm can be displaced in the direction of the X-Y- and Z-axis. Since the distance and the leading position between the aperture diaphragm and the detector arranged behind the aperture diaphragm have to be observed very closely, it is required to displace the entire detector unit together with the aperture diaphragm. Particularly with modern confocal microscopes, very complicated and sensitive detectors such as photo multiplier or spectographic multidetector arrangements are used. This results in that the detector unit occupies a large building space and is heavy. Therefore, the accurate positioning of the aperture diaphragm in the direction of the three axes is accompanied with considerable mechanical efforts. In this connection, it has to be considered that the adjustment of the aperture diaphragm has to be effected in the micrometer range.

From U.S. Pat. No. 5,334,830, it is further known to arrange additional adjustable tilted mirrors for adjusting the aperture diaphragm in the beam path. Aligning the focus with the opening of the aperture diaphragm is thus effected by adjusting the tilted mirrors arranged in the beam path. By arranging additional components such as transparent camera wedges in the beam path, color errors as well as reflection losses occur. Further, the structural length of the microscope increases.

It is the object of the invention to provide a microscope which is well adjustable with as small mechanical efforts as possible, particularly in case of highly precise requirements.

SUMMARY OF THE INVENTION

This object is solved, according to the invention, by the features of the following embodiments respectively. In one embodiment of the present invention, a microscope, particularly a confocal microscope, for the single-molecule spectroscopy is provided that includes: a specimen holding device for holding a specimen, an illuminating unit, an optics unit directing radiation produced by the illuminating unit towards the specimen and directing radiation given off by the specimen toward a detector unit, an aperture diaphragm arranged in the beam path in front of the detector unit, and a focusing lens arranged in the beam path in front of the aperture diaphragm, characterized in that the focusing lens is vertically adjustable with respect to its optical axis. In another embodiment of the present invention, a microscope, particularly confocal microscope, for the single-molecule spectroscopy, is provided that includes: a specimen holding device for holding a specimen, an illuminating unit, an optics unit comprising a beam splitter, which directs radiation produced by the illuminating unit towards the specimen and radiation given off by the specimen toward a detector unit, an aperture diaphragm arranged in the beam path in front of the detector unit, and a stationary focusing lens arranged in the beam path in front of the aperture diaphragm, characterized in that the beam splitter is adapted to be tilted to align the radiation given off by the specimen with the central axis of the opening of the aperture diaphragm.

BRIEF DESCRIPTION OF THE DRAWING

Hereinafter, the invention is explained in detail with respect to a preferred embodiment with reference to the appended drawing. The drawing shows a schematic structure of a confocal microscope according to the invention.

DETAILED DESCRIPTION OF ILLUSTRATIVE EMBODIMENTS OF THE INVENTION

According to the invention, adjusting is effected either by adjusting the focusing lens through which the radiation given off by the specimen is fixed onto the aperture diaphragm or by adjusting a beam splitter that may be provided in the optics unit. According to the invention, the aperture diaphragm is thus at most displaced in Z-direction, i.e., in the direction of its optical axis. Preferably, the aperture diaphragm is stationary.

The structure of the microscope according to the invention has the advantage that the adjustment of the aperture diaphragm together with the detector unit, which is possible with considerable mechanical efforts, is avoided in X-, Y- and Z-direction. The efforts are considerably reduced already when the aperture diaphragm, together with the detector unit, is exclusively adjustable in the direction of the Z-axis. Mechanically, the adjustment of the confocal microscope by adjusting the focusing lens and/or the beam splitter can be realized much more easily.

Experiments have shown that in contrast to the prevailing opinion, the optical errors occurring by adjusting the focusing lens and/or the beam splitter are negligibly small.

This also applies to confocal microscopes in particular. In this connection, it has to be guaranteed by the confocal microscope that a diffraction-limited measuring volume as small as possible is produced and observed. To this end, an objective with a numerical aperture as high as possible is used which is completely filled up by the illumination light. Thereby, the radius of the illuminated focus is defined. The size of the observed focus is adapted to this radius. With a given focus of the focus lens which amounts to between 160 and 200 mm in typical microscope arrangements, this adaptation can be achieved by selecting the diameter of the aperture diaphragm. To avoid significant losses of detected light as well as asymmetries of the measuring volume, the focus on the aperture diaphragm is only allowed to laterally shift by fractions of the diaphragm diameter. In case of confocal microscopes with high resolution, for example, this results in an objective focus of f=4 mm and a numerical aperture of 1.2. In case of a focus of the tube lens of 180 mm, the diameter of the aperture diaphragm amounts to about 30 µm. This results in an admissible shift of the focus in the X-Y-plane of 5 µm at most. An admissible angle error of 6" corresponds thereto.

In a first embodiment of the invention, the focusing lens is thus vertically adjustable to its optical axis, i.e., in the direction of the X- and/or Y-axis. Adjusting in the direction of the respectively other axis in the X-Y-plane can be effected by tilting the beam splitter. Particularly in case of confocal microscopes without a beam splitter or where the beam splitter cannot be exchanged, for example, and is thus preferably fixed in an non-adjustable position, the focusing with respect to the X-Y-plane is exclusively effected by displacing the focusing lens within this plane.

In this embodiment, the adjustment in the direction of the Z-axis can be effected by displacing the aperture diaphragm together with the detector unit. But it is also particularly preferred to realize the adjustment in the direction of the Z-axis by displacing the focusing lens in the direction of its optical axis, i.e., in the direction of the Z-axis.

The adjustment in the X-Y-plane is further possible by adjusting the beam splitter, preferably by tilting the beam splitter. Thereby, the beam path can be aligned with the central axis of the opening of the aperture diaphragm. The beam splitter can be adjusted in addition to the adjustment possibilities of the focusing lens.

In another preferred embodiment of the invention, only the beam splitter is adapted to be tilted. By tilting the beam splitter, an adjustment in the X-Y-plane can be effected. In this embodiment, the focusing lens is stationary.

For the adjustment in the Z-direction, the aperture diaphragm is displaceable together with the detector unit. The use of confocal microscopes in high-throughput screening requires the satisfaction of special requirements in order to increase the throughput, on the one hand, i.e. to reduce the measuring times of any single specimen, if possible. Therefore, the efficiency of the fluorescent light through the detector has to be optimized. This means that the numerical aperture of the detection optics the transmission of all the optical components in the detection path, at least in the relevant spectral region, as well as the quantum yield of the detector have to be optimized. In this respect, the microscope according to the invention has the advantage that the adjustment of the detection optics is effected without any additional components such as a tilted mirror or a camera wedge. This has the advantage that optical losses occurring because of these additional components do not occur.

Further, such microscopes are often used in high-throughput screening to be able to analyze several parameters, the intensity at different wavelengths or the polarization directions, for example. Since the measuring results are impaired when the fluorescence decays, these parameters should be measured simultaneously, if possible. This results in an extremely complicated detector structure. Since, according to the invention, the detector unit need not be moved or only in a particular direction together with the aperture diaphragm, the microscope according to the invention has a considerable advantage over existing microscopes since particularly the movement of large masses in narrow ranges of tolerance is not required.

Because of the afore-described advantages, the microscope according to the invention is particularly suitable for the single-molecule detection. The single-molecule detection is particularly suitable for the high-throughput screening since the measurement can be carried out with small substance amounts. Particularly, the afore-described advantages have a particularly advantageous effect since the individual molecules only emit weak signals. The impairment of weak signals by additional optical elements leads to a considerable falsification of the measuring results.

Further, there is the requirement, particularly for confocal microscopes, that the overlapping of the illumination and detection foci corresponds. In order to realize this, an as symmetrical and constant geometry as possible is required over the entire screening duration. This has its roots in that model assumptions concerning the measuring volume geometry enter such into the evaluation of the measurement and thus into the determination of the required single molecule properties. This particularly results in the requirement of stability of the measuring arrangement over the time and the possibility of a regular, possibly automatic, adjustment of the detection optics. This is possible with the microscope according to the invention.

The opening of the aperture diaphragm, for example, may be circular or split-shaped. Particularly in case of a split-shaped opening of the aperture diaphragm, it is advantageous to permit a rotation of the aperture diaphragm about its central axis. Thereby, the split-shaped opening of the aperture diaphragm can be aligned by simply rotating the aperture diaphragm.

An automatic adjustment of the microscope is particularly preferred. To this end, the focusing lens and/or the beam splitter comprises an adjusting mechanism permitting an adjustment of the focusing lens and/or the beam splitter via suitable drive elements, e.g., step motors or D.C. motor with position encoder. Additionally, an adjusting mechanism for displacing the aperture diaphragm together with the detector unit in the direction of the Z-axis may be provided. Preferably, the adjusting tolerance with respect to the opening of the aperture diaphragm is smaller than 3 μm, particularly preferably smaller than 2 μm.

As an illuminating unit, the confocal microscope comprises a laser 10. The light emitted by the laser 10 is directed onto a specimen 18 arranged in a recess 14 of a specimen support 16, such as a titer plate, by means of an optics unit 12.

The radiation reflected by the specimen 18 is directed toward a detector 20 by the optics unit 12.

The optics unit comprises lenses 22, 24 through which the radiation from the laser 10 is directed onto a beam splitter 26. From the beam splitter 26, the radiation is reflected toward the specimen 18. Through a microscope objective 28 arranged between the beam splitter 26 and the specimen 18, the radiation is focused into the specimen 18. The radiation reflected by the specimen 18 reaches the beam splitter 26 again through the microscope objective 28. The radiation given off by the specimen is let through and directed toward a focusing lens 30 by the beam splitter 26. Upon detecting fluorescent light, a dichromatic beam splitter (long-pass) is used. It may also be a semipermeable mirror (not selective as to wavelength).

Through the focusing lens 30, the radiation is focused into the opening 32 of an aperture diaphragm 34. After the radiation has passed the aperture diaphragm 34, it impinges onto a detector provided in the detector unit 20.

The focusing lens 30 is displaceable in the direction of the arrow 36, i.e., in X-direction, in the direction of the arrow 38, i.e., in Y-direction as well as in the direction of the arrow 39, i.e., in Z-direction, for adjusting the confocal microscope. Thus, it is possible to focus the beam path in such a manner by a single adjusting mechanism by which the focusing lens 30 is displaceable in the direction of the three axes that the focus is arranged in the opening 32 of the aperture diaphragm 34. In the ideal case, the focus thus lies on a central axis 40 of the beam path. Further, the central axis 40 is the central axis of the aperture opening 32. In the ideal case, the focus is also centered with respect to the height of the aperture diaphragm 34 by the adjustment in Z-direction so that an optimum light efficiency is realized.

In a particular embodiment, the aperture diaphragm 34 is displaceable exclusively in longitudinal direction of the beam path 43 for adjusting the distance between the focusing lens 30 and the aperture diaphragm 34. Alternately; the aperture diaphragm 34 is rotatable 44 about its central axis.

To make the required precision of the adjustment of the focusing lens 30 possible, the focusing lens is preferably borne by a linear ball bearing. A good guidance of the focusing lens 30 can also be achieved by a parallelogram guidance that also guarantees a guidance free from play at low efforts. Another possibility of bearing the focusing lens consists in a three-point bearing that, for example, comprises a V-groove and two adjusting screws, one bearing being configured so as to be resilient. The three-point bearing has the advantage that it may have a compact configuration and permits a bearing free from play at low efforts. To this end, the resilient system has to be free from play in the direction of the optical axis.

In embodiments where the adjustment is not effected via exclusively adjusting the focusing lens 30, the beam splitter 26 is adapted to be tilted. The beam splitter is tilted about both the X- and the Y-axis. In these embodiments, an additional adjustment in the direction of the Z-axis is required which can be realized either by displacing the focusing lens 30 or the aperture diaphragm 34 together with the detector unit 20.

Further, a filter 42 may be provided in the beam path. If the filter 42 is an exchangeable filter, the course of the beam path can be influenced by the exchange. Thereby, an adjustment becomes necessary. This can be effected by means of the device according to the invention, preferably automatically by adjusting the focusing lens 30.

The invention claimed is:

1. A confocal microscope for single-molecule spectroscopy, comprising:
   a specimen holding device for holding a specimen;
   an illuminating unit;
   an optics unit directing radiation produced by the illuminating unit toward the specimen and directing radiation given off by the specimen toward a detector unit;
   an aperture diaphragm arranged in a beam path in front of the detector unit; and
   a focusing lens arranged in the beam path in front of the aperture diaphragm,
   characterized in that the focusing lens is vertically adjustable with respect to the beam path.

2. A microscope according to claim 1, characterized in that the focusing lens is additionally adjustable in the direction of the beam path.

3. A microscope according to claim 1, characterized in that the optics unit comprises a beam splitter for directing the radiation and the beam splitter is adapted to be tilted to align the beam path with a central axis of the opening of the aperture diaphragm.

4. A microscope according to claim 3, characterized in that the beam splitter is exchangeable.

5. A microscope according to claim 1, characterized in that the aperture diaphragm is displaceable exclusively in longitudinal direction of the beam path for adjusting the distance between the focusing lens and the aperture diaphragm.

6. A microscope according to claim 1, characterized in that the aperture diaphragm is rotatable about a central axis of the aperture diaphragm.

7. A microscope according to claim 1, characterized in that the aperture diaphragm is stationary.

8. A microscope according to claim 1, characterized in that an opening of the aperture diaphragm is circular or split-shaped.

9. A microscope according to claim 1, characterized in that an adjusting tolerance with respect to the opening of an aperture diaphragm is smaller than 3 µm.

10. A microscope according to claim 1, characterized in that the adjusting tolerance with respect to the opening of the aperture diaphragm is smaller than 2 µm.

* * * * *